United States Patent [19]
Jung et al.

[11] Patent Number: 5,793,841
[45] Date of Patent: Aug. 11, 1998

[54] APPARATUS AND METHOD FOR RECEIVING DUAL HIGHWAY DATA IN ELECTRONIC SWITCHING SYSTEM

[75] Inventors: Jung Soo Jung; Bae Hyung Kim, both of Kyoungki-do, Rep. of Korea

[73] Assignee: Hyundai Electronics Industries Co., Ltd., Kyoungki-Do, Rep. of Korea

[21] Appl. No.: 634,391

[22] Filed: Apr. 18, 1996

[30] Foreign Application Priority Data

Apr. 18, 1995 [KR] Rep. of Korea ............... 19959093

[51] Int. Cl.$^6$ ................................................ G06F 11/10
[52] U.S. Cl. ................................ 371/49.1; 371/49.2
[58] Field of Search ............................... 371/49.1, 49.2, 371/48, 37.7, 61, 62, 47.1, 5.4; 395/182.04, 182.05, 180

[56] References Cited

U.S. PATENT DOCUMENTS 5,442,646  8/1995  Chadwick et al. ............... 371/43

*Primary Examiner*—Phung M. Chung
*Attorney, Agent, or Firm*—Wigman, Cohen, Leitner & Myers, P.C.

[57] ABSTRACT

An apparatus and a method for receiving dual highway data in an electronic switching system. First and second highway data are latched in response to an input latch clock signal and any one thereof waits for the output at a rising edge of the input latch clock signal. A parity bit of the first or second highway data is checked and the checked result is outputted for a first half period of a reference clock signal. The reference clock signal has half a period of the input latch clock signal. If a selected one of the first and second highway data has a parity error in accordance with the checked result, it is replaced by the other highway data for a latter half period of the reference clock signal while it waits for the output at the rising edge of the input latch clock signal. The replaced highway data is outputted at the rising edge of the input latch clock signal. If the first and second highway data are both valid and any one thereof has a parity error, a toggling operation is performed to alternately select the first and second highway data. Therefore, when parity errors are successively or randomly generated in one highway data due to a failure in a data reception integrated circuit or cable contact badness, the other highway data with no parity error can be accurately selected.

4 Claims, 5 Drawing Sheets

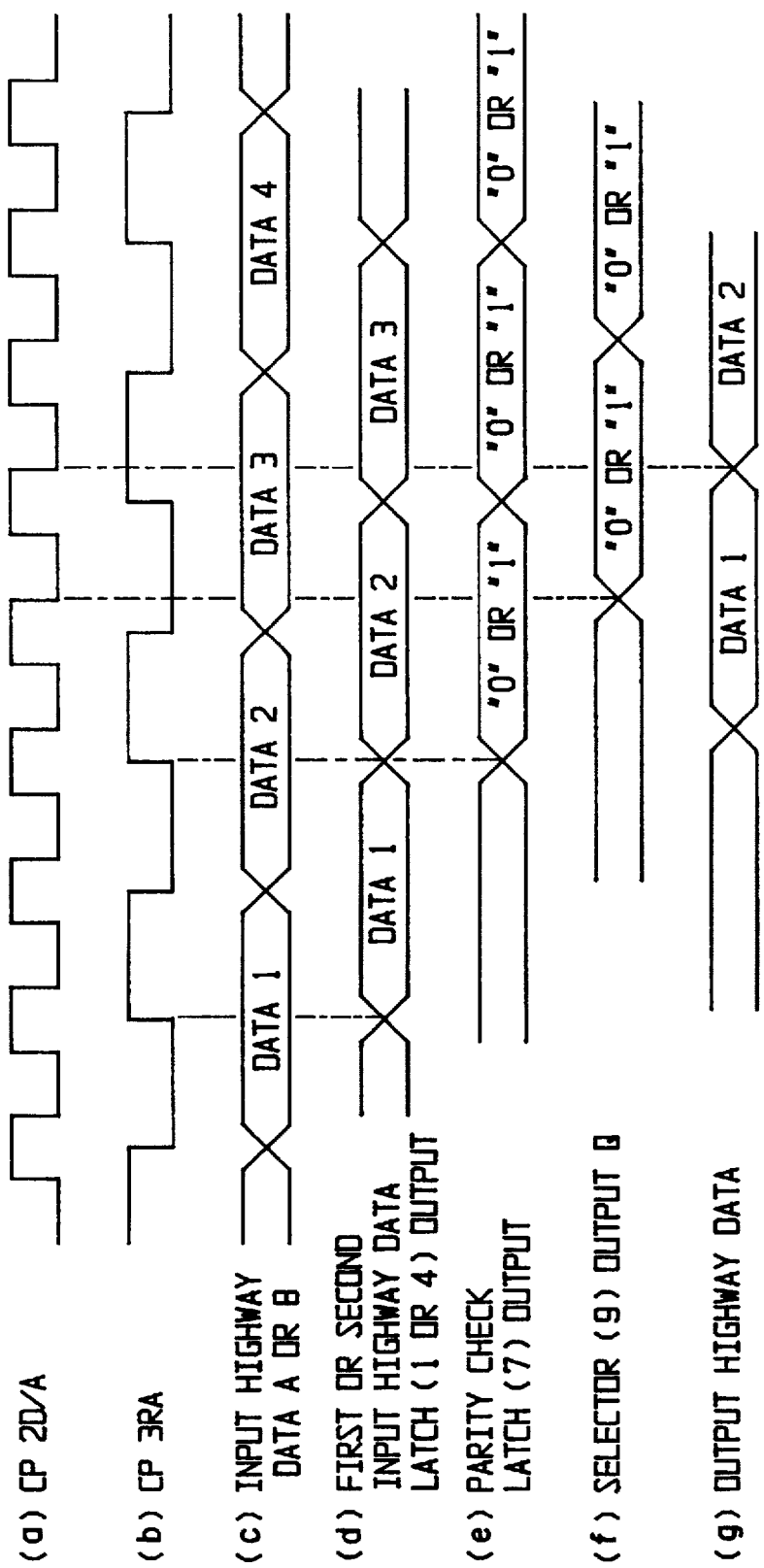
FIG. 2(a-g) (PRIOR ART)

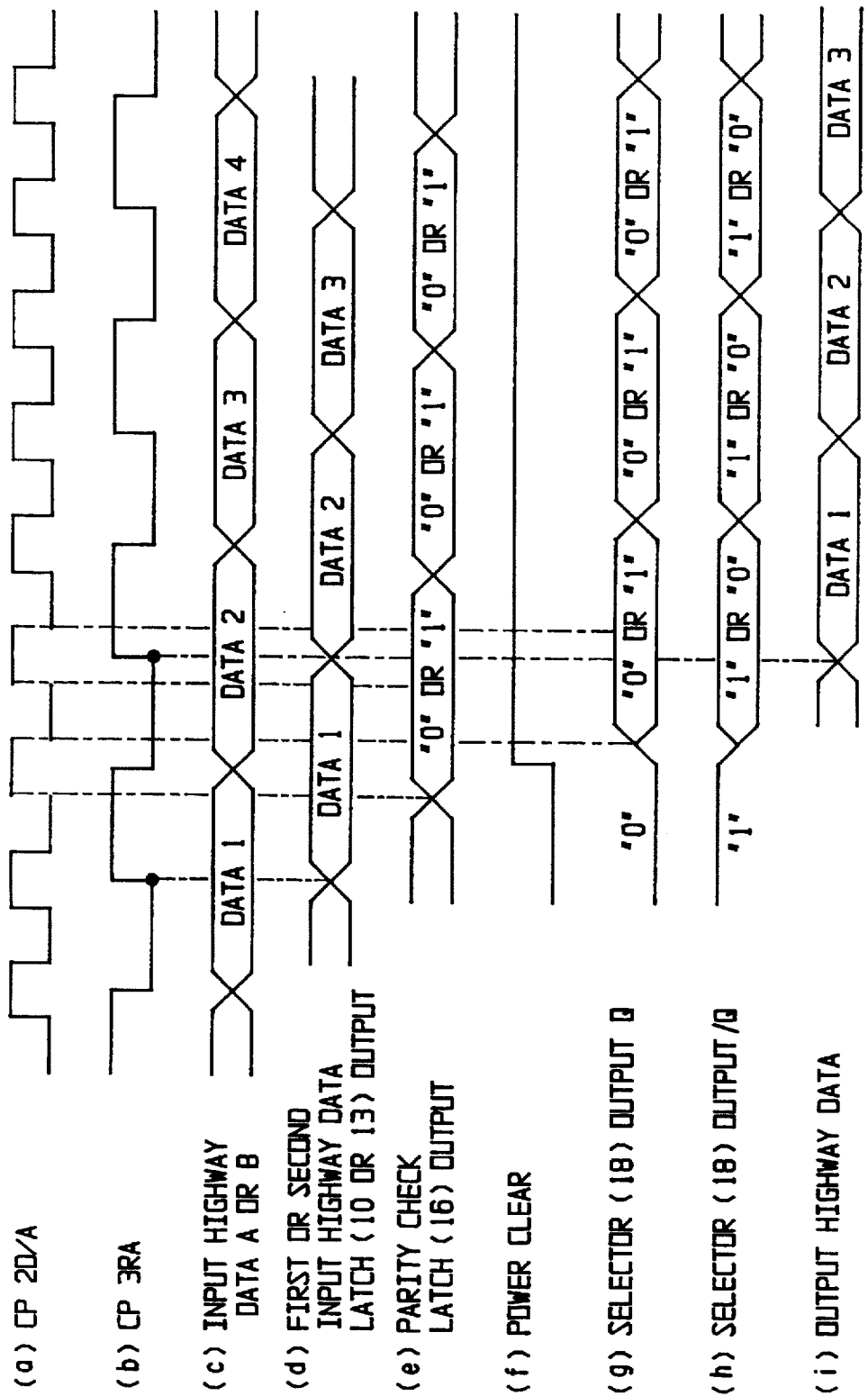

APPARATUS AND METHOD FOR RECEIVING DUAL HIGHWAY DATA IN ELECTRONIC SWITCHING SYSTEM

BACKGROUND OF THE INVENTION

1. Field of the Invention

The present invention relates in general to electronic switching systems (ESSs) employing a code division multiple access (CDMA) manner, and more particularly to an apparatus and a method for receiving dual highway data in an electronic switching system, in which, when parity errors are successively or randomly generated in one highway data due to a failure in a data reception integrated circuit or cable contact badness, the other highway data with no parity error is received in accordance with the parity checked result.

2. Description of the Prior Art

FIG. 1a is a block diagram of a conventional differential receiver for receiving dual highway data in an electronic switching system, FIG. 1b is a block diagram illustrating the position of the conventional differential receiver of FIG. 1a in the electronic switching system and FIGS. 2a to 2g are timing diagrams illustrating the operation of the conventional differential receiver in FIG. 1a.

Referring to FIG. 1b, the differential receiver is designated by the reference numeral 101. The differential receiver 101 receives dual highway data from a data link unit (DLU) through a plurality of cables and transmits the received dual highway data to a space matrix switch board assembly (SMXA) through a data rate converter 102 and a differential transmitter 103. The differential receiver 101 also transmits the received dual highway data to a processor interface and control board assembly (PICA).

Referring to FIG. 1a, the differential receiver receives dual highway data Highway A and Highway B through a plurality of cables such as, for example, a space switch duplication cable (SSWDC) and a space switch link cable (SSWLC). The space switch duplication cable includes a valid data line VALID_A indicative of the presence of the highway data Highway A and an alarm line (SSWDCG: space switch duplication cable ground) indicative of the cable connection state. The alarm line SSWDCG is typically a ground line of the space switch duplication cable. The space switch link cable includes a valid data line VALID_B indicative of the presence of the highway data Highway B and an alarm line (SSWLCG: space switch link cable ground) indicative of the cable connection state. The alarm line SSWLCG is typically a ground line of the space switch link cable. In result, the space switch duplication cable provides the highway data Highway A of nine bits, the valid data VALID_A of one bit and the alarm information SSWDCG of ground level, and the space switch link cable provides the highway data Highway B of nine bits, the valid data VALID_B of one bit and the alarm information SSWLCG of ground level. In the case where the highway data Highway A or Highway B is received as shown in FIG. 2c, it contains a parity bit at its last digit. For example, the highway data DATA1 is provided with eight data bits and one parity bit as its ninth bit.

As shown in FIG. 1a, the differential receiver comprises a first input highway data latch 1 for latching the first highway data Highway A in response to an input latch clock signal CP3RA as shown in FIG. 2b, and a second input highway data latch 4 for latching the second highway data Highway B in response to the input latch clock signal CP3RA. The first input highway data latch 1 outputs the latched first highway data Highway A as shown in FIG. 2d in response to an output control signal (OC: output control). The second input highway data latch 4 outputs the latched second highway data Highway B as shown in FIG. 2d in response to the output control signal OC. At this time, each of the output signals from the first and second input highway data latches 1 and 4 is nine bits in which eighth bits are highway data bits and the remaining one bit is a parity bit.

The differential receiver further comprises an output highway data latch 5 for providing output highway data (FIG. 2g), a parity checker 6 and a parity check latch 7. Preferably, the output highway data latch 5 receives the eight data bits from each of the first and second input highway data latches 1 and 4, and the parity checker 6 receives the nine bits (eight data bits and one parity bit) from each of the first and second input highway data latches 1 and 4. The parity checker 6 checks a value of the received parity bit and applies the checked parity bit value of logic 1 (high) or 0 (low) to the parity check latch 7. Then, the parity check latch 7 provides its output value of logic 0 (low) or 1 (high) as shown in FIG. 2e to an input terminal P of a controller 8 synchronously with a rising edge of the input latch clock signal CP3RA. Here, the controller 8 functions as a flip-flop.

The differential receiver further comprises a first valid data latch 2 for latching the first valid data VALID_A to indicate the presence of the first highway data Highway A, and a second valid data latch 3 for latching the second valid data VALID_B to indicate the presence of the second highway data Highway B. The first valid data latch 2 outputs the latched first valid data VALID_A to an input terminal A of the controller 8, and the second valid data latch 3 outputs the latched second valid data VALID_B to an input terminal B of the controller 8.

The controller 8 provides its control values to a selector 9 in response to the output value from the parity check latch 7 and the output data from the first and second valid data latches 2 and 3. The selector 9 applies the output control signal Q as shown in FIG. 2f to the OC inputs of the first and second input highway data latches 1 and 4 in response to a synchronous clock signal CP2D\A (FIG. 2a) and the control values from the controller 8. Noticeably, the parity check latch 7 is operated in response to the input latch clock signal CP3RA in a similar manner to the first and second input highway data latches 1 and 4. For this reason, the result obtained by checking the parity bit of the initial highway data Highway A or Highway B (e.g., DATA1) has no effect on the output control signal Q of the selector 9 when the first and second input highway data latches 1 and 4 latch the initial highway data Highway A and Highway B, respectively. In other words, the parity checked result has an effect on the selection of the subsequent data DATA2.

The below truth table 1 shows the operation of the controller 8 which selects the received highway data. In the truth table 1, the parity bit values are connected with the second highway data Highway B. If the output values VALID_A and VALID_B from the first and second valid data latches 2 and 3 are both 0 (low) in logic, the parity bit of the first highway data Highway A is 1 (high) in logic, namely, erroneous and the parity bit of the second highway data Highway B is 0 (low) in logic, namely, normal, then the output values from the controller 8 are determined according to the parity values in such a manner that the second highway data Highway B can be selected instead of the first highway data Highway A. On the other hand, when parity errors are continuously generated in the second highway data Highway B, the first highway data Highway A is selected. However, in the case where a parity error is temporarily generated in the first highway data Highway A under such a condition, the second highway data Highway B with the parity error is selected.

TRUTH TABLE 1

| Controller Input | | | Controller Output | |
|---|---|---|---|---|
| VALID_A | VALID_B | PARITY | J | K |
| 0 | 0 | 0 | 0 | 1 |
| 0 | 0 | 1 | 1 | 0 |
| 0 | 1 | 0 | 0 | 1 |
| 0 | 1 | 1 | 0 | 1 |
| 1 | 0 | 0 | 1 | 0 |
| 1 | 0 | 1 | 1 | 0 |
| 1 | 1 | 0 | 0 | 0 |
| 1 | 1 | 1 | 0 | 0 | where, "1" is high (erroneous) in logic and "0" is low (normal) in logic.

The controller output values J and K in the above truth table 1 can be expressed as follows:

$$J = /B \cap (A \cup P)$$

$$K = /A \cap (B \cup P)$$

where, "A" is the output value VALID_A from the first valid data latch 2, if "B" is the output value VALID_B from the second valid data latch 3, "$\cap$" is logical product, "$\cup$" is logical sum and "/" is inverse.

On the other hand, one example of techniques for reducing an error amount in the data transmission/reception in a communication field is disclosed in U.S. Pat. No. 5,442,646. The '646 patent relates to allocating a plurality of bits for the reliability of a receiver channel in a vehicle traffic information communication system. However, the '646 patent does not propose any technique for detecting a parity bit for the reliability of received data.

SUMMARY OF THE INVENTION

Therefore, the present invention has been made in view of the above problem, and it is an object of the present invention to provide an apparatus and a method for receiving dual highway data in an electronic switching system, in which a parity check latch and a selector are operated synchronously with a reference clock signal with half a period of an input latch clock signal and a controller provides its output values as follows:

$$J = /B \cap (A \cup P)$$

$$K = /A$$

where, "J" and "K" are the output values from the controller, "A" is an output value from a first valid data latch, "B" is an output value from a second valid data latch, "$\cap$" is logical product, "$\cup$" is logical sum and "/" is inverse.

In accordance with one aspect of the present invention, there is provided a differential receiver for receiving dual highway data in an electronic switching system, comprising a first input highway data latch for latching first highway data in response to an input latch clock signal and outputting the latched first highway data in response to a first output control signal; a second input highway data latch for latching second highway data in response to the input latch clock signal and outputting the latched second highway data in response to a second output control signal, the first and second output control signals having the opposite levels; a first valid data latch for latching first valid data in response to the input latch clock signal and first alarm information, the first valid data indicating the presence of the first highway data, the first alarm information indicating a connection state of a cable associated with the first highway data; a second valid data latch for latching second valid data in response to the input latch clock signal and second alarm information, the second valid data indicating the presence of the second highway data, the second alarm information indicating a connection state of a cable associated with the second highway data; an output highway data latch for latching the first or second highway data from the first or second input highway data latch and outputting the latched first or second highway data in response to the input latch clock signal; a parity checker for checking a parity bit of the first or second highway data from the first or second input highway data latch; a parity check latch for receiving the checked result from the parity checker and outputting the received result in response to a reference clock signal, the reference clock signal having half a period of the input latch clock signal; a controller for receiving output values from the first and second valid data latches and an output value from the parity check latch and providing its toggled first and second output values when the output value from the parity check latch is erroneous under the condition that the output values from the first and second valid data latches are normal; and a selector for outputting the first and second output control signals respectively to the first and second input highway data latches in response to the first and second output values from the controller, the reference clock signal and a power clear signal.

In accordance with another aspect of the present invention, there is provided a method for receiving dual highway data in an electronic switching system, comprising the first step of latching first and second highway data in response to an input latch clock signal; the second step of allowing the latched first or second highway data to wait for the output at a rising edge of the input latch clock signal; the third step of checking a parity bit of the first or second highway data and outputting the checked result for a first half period of a reference clock signal, the reference clock signal having half a period of the input latch clock signal; the fourth step of replacing a selected one of the first and second highway data by the other highway data for a latter half period of the reference clock signal while it waits for the output at the rising edge of the input latch clock signal, if it has a parity error in accordance with the checked result; the fifth step of outputting the replaced highway data at the rising edge of the input latch clock signal; and the sixth step of performing a toggling operation to alternately select the first and second highway data if the first and second highway data are both valid and any one thereof has a parity error.

BRIEF DESCRIPTION OF THE DRAWINGS

The above and other objects, features and advantages of the present invention will be more clearly understood from the following detailed description taken in conjunction with the accompanying drawings, in which:

FIGS. 2a to 2g are timing diagrams illustrating the operation of the conventional differential receiver in FIG. 1a;

FIGS. 4a to 4i are timing diagrams illustrating the operation of the differential receiver in FIG. 3 in accordance with the embodiment of the present invention.

DETAILED DESCRIPTION OF THE PREFERRED EMBODIMENTS

Figure 3:
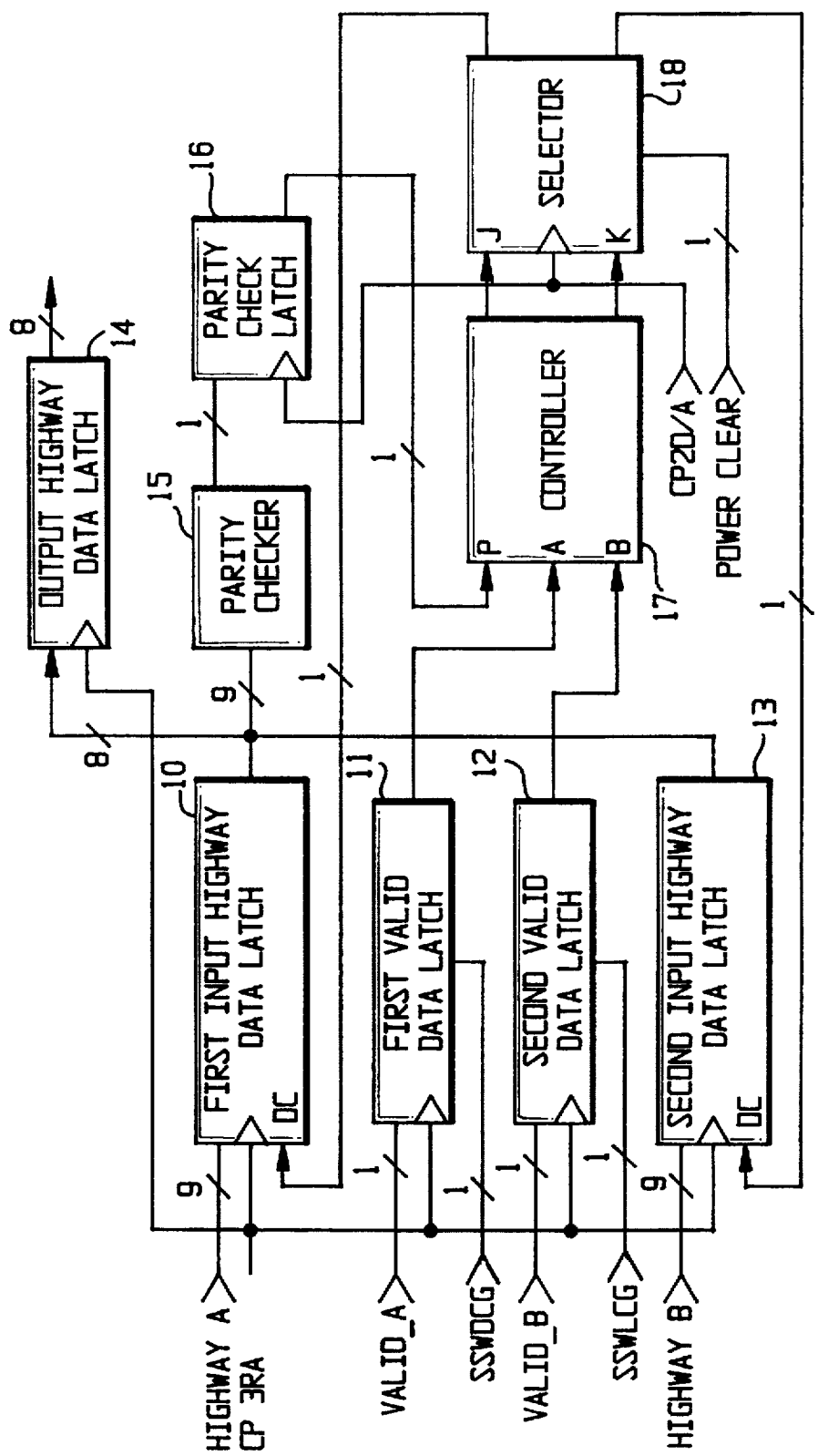
FIG. 3 is a block diagram of a differential receiver for receiving dual highway data in an electronic switching system in accordance with an embodiment of the present invention.

Referring to FIG. 3, there is shown a block diagram of a differential receiver for receiving dual highway data in an electronic switching system in accordance with an embodiment of the present invention. As shown in this drawing, the differential receiver comprises a first input highway data latch 10 for latching first highway data Highway A in response to an input latch clock signal CP3RA and outputting the latched first highway data Highway A in response to a first output control signal Q from a selector 18, and a second input highway data latch 13 for latching second highway data Highway B in response to the input latch clock signal CP3RA and outputting the latched second highway data Highway B in response to a second output control signal /Q from the selector 18. The first and second output control signals Q and /Q from the selector 18 have the opposite levels.

The differential receiver further comprises a first valid data latch 11 for latching first valid data VALID_A in response to the input latch clock signal CP3RA and first alarm information SSWDCG, and a second valid data latch 12 for latching second valid data VALID_B in response to the input latch clock signal CP3RA and second alarm information SSWLCG. The first valid data VALID_A indicates the presence of the first highway data Highway A, and the second valid data VALID_B indicates the presence of the second highway data Highway B.

The differential receiver further comprises an output highway data latch 14 for receiving the first or second highway data Highway A or Highway B from the first or second input highway data latch 10 or 13 and outputting the received first or second highway data Highway A or Highway B in response to the input latch clock signal CP3RA, and a parity checker 15 for checking a parity bit of the first or second highway data Highway A or Highway B from the first or second input highway data latch 10 or 13 and outputting the checked result to a parity check latch 16.

The parity check latch 16 is adapted to receive the checked result from the parity checker 15 and output the received result to a controller 17 in response to a reference clock signal CP2D\A. The controller 17 is adapted to receive the output values from the first and second valid data latches 11 and 12 and the output value from the parity check latch 16 respectively at its input terminals A, B and P and provide its toggled first and second output values J and K to the selector 18 when the output value from the parity check latch 16 is erroneous under the condition that the output values from the first and second valid data latches 11 and 12 are normal. The selector 18 functions as a J-K flip-flop. The selector 18 is adapted to output the first and second output control signals Q and /Q of the opposite levels respectively to output control input terminals (OC: output control) of the first and second input highway data latches 10 and 13 in response to the first and second output values J and K from the controller 17 and the reference clock signal CP2D\A. The selector 18 also has a power clear terminal POWER CLEAR.

The operation of the differential receiver with the above-mentioned construction in accordance with the embodiment of the present invention will hereinafter be described in detail with reference to FIGS. 4a to 4i.

Figure 1A:
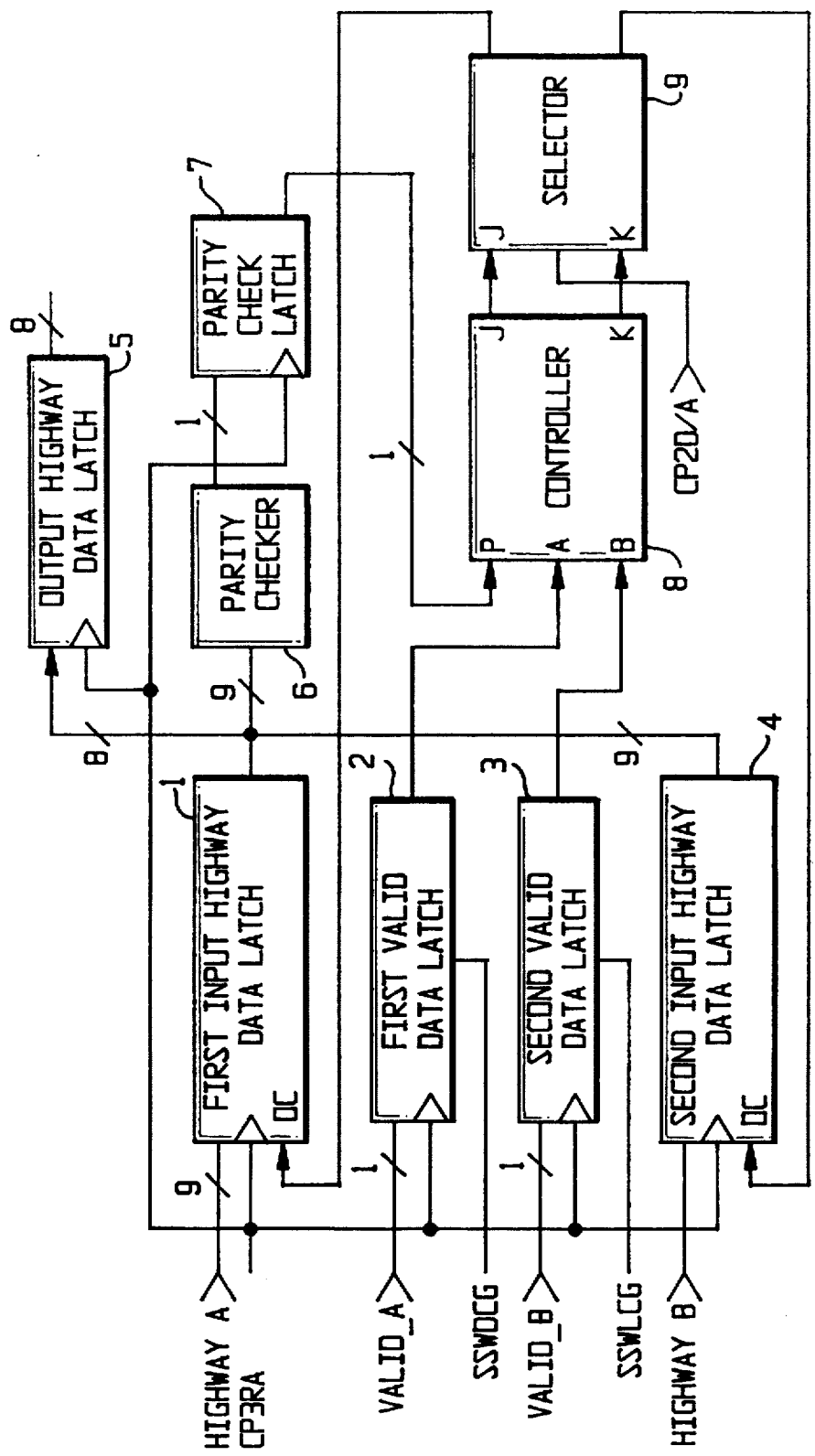
FIG. 1a is a block diagram of a conventional differential receiver for receiving dual highway data in an electronic switching system.
Figure 1B:
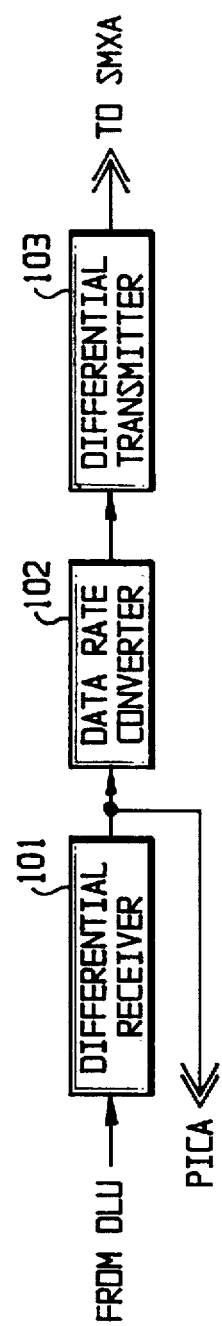
FIG. 1b is a block diagram illustrating the position of the conventional differential receiver of FIG. 1a in the electronic switching system.

In FIG. 3, the parity check latch 16 is operated in response to the reference clock signal CP2D\A in a similar manner to the selector 18. For reference, the conventional parity check latch 7 in FIG. 1a corresponding to the parity check latch 16 was operated in response to the input latch clock signal CP3RA. As a result, the result obtained by checking the parity bit of the received highway data Highway A or Highway B has a direct effect on the associated data selection. The below truth table 2 shows the operation of the controller 17 which selects the received highway data. As seen from the truth table 2, if the output values VALID_A and VALID_B from the first and second valid data latches 11 and 12 are both normal (logic 0) and the parity bit of the first or second highway data Highway A or Highway B is erroneous (logic 1), namely, if the first and second highway data Highway A and Highway B are present in the corresponding cables and any one of the cables is in bad contact, the first and second output values J and K from the controller 17 are toggled.

TRUTH TABLE 2

| Controller Input | | | Controller Output | | Highway Data |
|---|---|---|---|---|---|
| VALID_A | VALID_B | PARITY | J | K | Selection |
| 0 | 0 | 0 | 0 | 1 | Highway A |
| 0 | 0 | 1 | 1 | 1 | Toggle |
| 0 | 1 | 0 | 0 | 1 | Highway A |
| 0 | 1 | 1 | 0 | 1 | Highway A |
| 1 | 0 | 0 | 1 | 0 | Highway B |
| 1 | 0 | 1 | 1 | 0 | Highway B |
| 1 | 1 | 0 | 0 | 0 | Previous Status |
| 1 | 1 | 1 | 0 | 0 | Previous Status | where, "1" is high (erroneous) in logic and "0" is low (normal) in logic.

The controller output values J and K in the above truth table 2 can be expressed as follows:

$$J = /B \cap (A \cup P)$$

$$K = /A$$

where, "A" is the output value VALID_A from the first valid data latch 11, "B" is the output value VALID_B from the second valid data latch 12, "∩" is logical product, "∪" is logical sum and "/" is inverse.

FIGS. 4a to 4i are timing diagrams illustrating the operation of the differential receiver in FIG. 3 in accordance with the embodiment of the present invention. The parity check latch 16 provides its output value as shown in FIG. 4e to the input terminal P of the controller 17 at a rising edge of the reference clock signal CP2D\A as shown in FIG. 4a. The first and second valid data latches 11 and 12 generate output values of logic 1 (high) or 0 (low) state according to the presence of the first and second valid data VALID_A and VALID_B, respectively. Then, the first and second valid data latches 11 and 12 provide the generated output values to the input terminals A and B of the controller 17, respectively. The first and second alarm information SSWDCG and SSWLCG to the first and second valid data latches 11 and 12 indicate the corresponding cable connection states. If the first and second alarm information SSWDCG and SSWLCG are 0 in logic, the cable connection states are normal. To the contrary, if the first and second alarm information SSWDCG and SSWLCG are 1 in logic, the cable connection states are abnormal. As a result, the first and second output values J and K of the controller 17 are determined according to the logic values at the input terminals P, A and B of the controller 17. The selector 18 functions as a J-K flip-flop. For this reason, the first and second output control signals Q and /Q of the selector 18 have the opposite levels as shown in FIGS. 4g and 4h. Also, the selector 18 is driven when the power clear terminal POWER CLEAR goes from low to high in logic. This has the effect of removing an initial operation error of the selector 18.

As mentioned above, the selector 18 and the parity check latch 16 are operated synchronously with the reference clock signal CP2D\A. For example, in the case where the second output control signal /Q of the selector 18 is 1 in logic because of the generation of a parity error in the second highway data Highway B, the output of the first input highway data latch 10 is used instead of the output of the second input highway data latch 13 so that the first highway data Highway A can be selected instead of the second highway data Highway B. Therefore, the highway data with no parity error is provided to the output highway data latch 14.

In other words, the parity check latch 16 is not synchronized with the input latch clock signal CP3RA with a low rate but the reference clock signal CP2D\A. Also, the parity check latch 16 is operated at a rising edge of the reference clock signal CP2D\A as shown in FIG. 4e and the selector 18 is operated at a falling edge of the reference clock signal CP2D\A as shown in FIGS. 4g and 4h. As a result, upon the generation of a parity error, the first or second input highway data latch 10 or 13 is operated in response to the first or second output control signal Q or /Q from the selector 18 under the control of the controller 17 to change the selection of the first or second highway data Highway A or Highway B.

For example, assume that the first highway data Highway A (e.g., DATA1) from the first input highway data latch 10 is selected and has a parity error at the moment * in FIG. 4e. At this time, the output of the parity check latch 16 is changed as shown in FIG. 4e at a rising edge of the reference clock signal CP2D\A and the first and second output control signals Q and /Q of the selector 18 are changed as shown in FIGS. 4g and 4h at a falling edge (i.e., half period point) of the reference clock signal CP2D\A.

By the way, the first highway data DATA1 from the first input highway data latch 10 is being latched in the output highway data latch 14 for the output at the subsequent rising edge of the input latch clock signal CP3RA.

Because the first highway data DATA1 from the first input highway data latch 10 has the parity error as mentioned above, the output highway data latch 14 latches the second highway data DATA1 from the second input highway data latch 13 and outputs the latched second highway data DATA1 at the subsequent rising edge (i.e., the moment ** in FIG. 4i) of the input latch clock signal CP3RA. In other words, for one period of the input latch clock signal CP3RA as indicated by "o" in FIG. 4b, namely, the time that the output highway data latch 14 latches the first or second highway data Highway A or Highway B for the output thereof, the parity check latch 16 and the selector 18 are operated in response to the same reference clock signal CP2D\A with a half period difference between the rising and falling edges as shown in FIGS. 4e and 4g. As a result, when the selected one of the first and second highway data Highway A and Highway B has a parity error, it is replaced by the other highway data within one period of the input latch clock signal CP3RA. Therefore, the output highway data latch 14 can output the highway data with no parity error.

On the other hand, as seen from the truth table 2, when the output values VALID_A and VALID_B from the first and second valid data latches 11 and 12 are both normal (logic 0) and the parity bit of the first or second highway data Highway A or Highway B is erroneous (logic 1), namely, when the first and second highway data Highway A and Highway B are present in the corresponding cables and any one of the cables is in bad contact, the first and second output values J and K from the controller 17 are toggled. In other words, if the parity bit of the first highway data Highway A (e.g., DATA1) is 1 in logic, the selector 18 selects the first highway data Highway A for the first half period of the received highway data DATA1, whereas it selects the second highway data Highway B for the latter half period of the received highway data DATA1 according to the toggling operation.

In result, the output highway data latch 14 can receive the second highway data Highway B with no parity error synchronously with the input latch clock signal CP3RA.

Further, in the case where parity errors are successively generated in the second highway data Highway B and a parity bit is generated in the data portion DATA1 of the first highway data Highway A, the data portion DATA1 of the second highway data Highway B is selected and the subsequent data portions of the first highway data Highway A with no parity error are then selected according to the toggling operation.

As apparent from the above description, according to the present invention, when parity errors are successively or randomly generated in one highway data due to a failure in a data reception integrated circuit or cable contact badness, the other highway data with no parity error can be accurately selected. Therefore, the present invention has the effect of enhancing the performance of the electronic switching system.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A differential receiver for receiving dual highway data in an electronic switching system, comprising:

a first input highway data latch for latching first highway data in response to an input latch clock signal and outputting the latched first highway data in response to a first output control signal;

a second input highway data latch for latching second highway data in response to the input latch clock signal and outputting the latched second highway data in response to a second output control signal, the first and second output control signals having the opposite levels;

a first valid data latch for latching first valid data in response to the input latch clock signal and first alarm information, the first valid data indicating the presence of the first highway data, the first alarm information indicating a connection state of a cable associated with the first highway data;

a second valid data latch for latching second valid data in response to the input latch clock signal and second alarm information, the second valid data indicating the presence of the second highway data, the second alarm information indicating a connection state of a cable associated with the second highway data;

an output highway data latch for latching the first or second highway data from said first or second input highway data latch and outputting the latched first or second highway data in response to the input latch clock signal;

a parity checker for checking a parity bit of the first or second highway data from said first or second input highway data latch;

a parity check latch for receiving the checked result from said parity checker and outputting the received result in response to a reference clock signal, the reference clock signal having half a period of the input latch clock signal;

a controller for receiving output values from said first and second valid data latches and an output value from said parity check latch and providing its toggled first and second output values when the output value from said parity check latch is erroneous under the condition that the output values from said first and second valid data latches are normal; and a selector for outputting the first and second output control signals respectively to said first and second input highway data latches in response to the first and second output values from said controller, the reference clock signal and a power clear signal.

2. A differential receiver for receiving dual highway data in an electronic switching system, as set forth in claim 1, wherein the first and second output values from said controller are determined according to the output values from said first and second valid data latches and the output value from said parity check latch and respectively satisfies the following Boolean expression:

$$J = /B \cap (A \cup P)$$

$$K = /A$$

where, "A" is the output value from said first valid data latch, "B" is the output value from said second valid data latch, "∩" is logical product, "∪" is logical sum, "/" is an inverse, "J" is the first output value from said controller, "K" is the second output value from said controller, and "P" is the output value from said parity check.

3. A differential receiver for receiving dual highway data in an electronic switching system, as set forth in claim 1, wherein said selector selects the second highway data from said second input highway data latch if only the first output value from said controller is 1 in logic and the first highway data from said first input highway data latch if only the second output value from said controller is 1 in logic and performs a toggling operation if the first and second output values from said controller are both 1 in logic.

4. A method for receiving dual highway data in an electronic switching system, comprising the steps of:

latching first and second highway data in response to an input latch clock signal;

allowing the latched first or second highway data to wait for the output at a rising edge of the input latch clock signal;

checking a parity bit of the first or second highway data and outputting the checked result for a first half period of a reference clock signal, the reference clock signal having half a period of the input latch clock signal;

replacing a selected one of the first and second highway data by the other highway data for a latter half period of the reference clock signal while it waits for the output at the rising edge of the input latch clock signal, if it has a parity error in accordance with the checked result;

outputting the replaced highway data at the rising edge of the input latch clock signal; and performing a toggling operation to alternately select the first and second highway data if the first and second highway data are both valid and any one thereof has a parity error.

* * * * *